US006978382B1

(12) United States Patent
Bender et al.

(10) Patent No.: US 6,978,382 B1
(45) Date of Patent: Dec. 20, 2005

(54) METHOD AND AN APPARATUS FOR GRANTING USE OF A SESSION OF A PACKET DATA TRANSMISSION STANDARD DESIGNATED BY AN IDENTIFIER

(75) Inventors: Paul E. Bender, San Diego, CA (US); Ramin Rezaiifar, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 596 days.

(21) Appl. No.: 09/638,752

(22) Filed: Aug. 14, 2000

(51) Int. Cl.[7] .................. H04L 9/00; H04L 12/66; H04L 12/28; H04M 1/00; H04Q 7/20
(52) U.S. Cl. ............... 713/201; 713/200; 370/352; 370/392; 455/450; 455/445; 455/552.1
(58) Field of Search .................. 713/200, 201; 455/450, 445, 552.1; 370/392, 352

(56) References Cited

U.S. PATENT DOCUMENTS

| 4,200,770 A | 4/1980 | Hellman, et al. |
| 4,901,307 A | 2/1990 | Gilhousen, et al. |
| 5,103,459 A | 4/1992 | Gilhousen, et al. |
| 5,946,634 A * | 8/1999 | Korpela .................. 455/552.1 |
| 5,974,566 A | 10/1999 | Ault, et al. .................. 714/15 |
| 6,636,502 B1 * | 10/2003 | Lager et al. ................ 370/352 |

FOREIGN PATENT DOCUMENTS

WO  9952303  10/1999

OTHER PUBLICATIONS

Mathur, Ajay, "The Speed Demon: 3G Telecommunications", IBM, Mar. 1, 2002, pp. 1-11.*

* cited by examiner

*Primary Examiner*—Matthew Smithers
*Assistant Examiner*—Courtney D. Fields
(74) *Attorney, Agent, or Firm*—Philip Wadsworth; Sandra L. Godsey; Pavel Kalousek

(57) ABSTRACT

A method and an apparatus granting a terminal, which requests a communication with a network access server using a session of a standard for packet data transmission designated by an identifier, use of the requested session, when a security association between the access terminal and the network access server is verified.

28 Claims, 3 Drawing Sheets

METHOD AND AN APPARATUS FOR GRANTING USE OF A SESSION OF A PACKET DATA TRANSMISSION STANDARD DESIGNATED BY AN IDENTIFIER

BACKGROUND OF THE INVENTION

I. Field of the Invention

The current invention relates to communications. More particularly, the present invention relates to a method, an apparatus, and an article of manufacture for granting a terminal, which is establishing a communication with a network access server via a non-trusted access network, use of a previously established session of a packet data transmission standard.

II. Description of the Related Art

With an increasing popularity of both wireless communications and network—especially Internet—applications, various methods and systems are under development to allow a user of a wireless device to access email, web pages, and other network resources. Because information on the Internet is organized into discrete "packets" of data, these services are often referred to as "packet data services."

Several multiple-access communication system techniques are considered to provide wireless packet data services. Among the different types of wireless communication systems are time division multiple access (TDMA), frequency division multiple access (FDMA), AM modulation schemes such as amplitude companded single sideband (ACSSB) modulation, and code division multiple access (CDMA). These communication systems have been standardized to facilitate interoperation between equipment manufactured by different companies. In particular, CDMA communications systems have been standardized in the United States in Telecommunications Industry Association TIA/EIA/IS-95-B, entitled "MOBILE STATION-BASE STATION COMPATIBILITY STANDARD FOR DUAL-MODE WIDEBAND SPREAD SPECTRUM CELLULAR SYSTEM," hereinafter referred to as IS-95.

The International Telecommunications Union recently requested a submission of proposed methods for providing high-rate data and high-quality speech services over wireless communication channels. A first proposal was issued by the Telecommunications Industry Association, entitled "The cdma2000 ITU-R RTT Candidate Submission." The proposal issued as an Industry Standard 2000 (IS-2000). A second proposal was issued by the European Telecommunications Standards Institute (ETSI), entitled "The ETSI UMTS Terrestrial Radio Access (UTRA) ITU-R RTT Candidate Submission," also known as "wideband CDMA," and hereinafter referred to as W-CDMA. A third proposal was submitted by U.S. task group (TG) 8/1, entitled "The UWC-136 Candidate Submission," hereinafter referred to as EDGE. The contents of these submissions are of public record and are well known in the art.

In wireless communication systems, there are significant differences between the requirements for providing voice and data services. Such differences, well known in the art, result in compromises in design of hybrid high-rate data and high-quality speech wireless communication systems. Consequently, where only data services are required, (e.g., Internet or fax transmissions) a wireless communication system optimized for transmission of high data rates (HDR) may be used. An exemplary HDR system defines a set of data rates at which data are transmitted and received by a wireless station, ranging from 38.4 kbps to 2.4 Mbps. Such a system is disclosed in a co-pending application Ser. No. 08/963,386, entitled "METHOD AND APPARATUS FOR HIGH RATE PACKET DATA TRANSMISSION," filed Nov. 3, 1997, now U.S. Pat. No. 6,574,211, issued Jun. 3, 2003, assigned to the assignee of the present invention and incorporated by reference herein.

Several Internet Protocol (IP) standards have been developed by the Internet Engineering Task Force (IETF) to facilitate mobile packet data services for Internet. Mobile IP is one such standard, and was designed to allow a device having an IP address to exchange data with the Internet while physically traveling throughout a network (or networks). Mobile IP is described in detail in IETF request for comments (RFC), entitled "IP Mobility Support," and incorporated herein by reference.

The framing and transmission of IP data through a CDMA wireless network is well known in the art and has been described in TIA/EIA/IS-707-A standard, entitled "DATA SERVICE OPTIONS FOR SPREAD SPECTRUM SYSTEM," hereinafter referred to as IS-707.

Several other IETF standards set forth techniques referred to in the above-named references. Point-to-Point Protocol (PPP) is well known in the art and is described in IETF RFC 1661, entitled "The Point-to-Point Protocol (PPP)" and published in July 1994, hereinafter referred to as PPP. PPP includes a Link Control Protocol (LCP) and several Network Control Protocols (NCP) used for establishing and configuring different network-layer protocols over a PPP link.

One such NCP is the Internet Protocol Control Protocol (IPCP), well known in the art and described in IETF RFC 1332, entitled "The PPP Internet Protocol Control Protocol (IPCP)," published in May of 1992, and hereinafter referred to as IPCP. Extensions to the LCP are well known in the art and described in IETF RFC 1570, entitled "PPP LCP Extensions," published in January 1994, and hereinafter referred to as LCP.

Access terminals, e.g., cellular or personal communication systems (PCS) telephones with Internet connections, typically transmit packet data over a network by establishing a session of a packet data transmission standard with a packet network access server (NAS), e.g., a packet data service node (PDSN). The session of a packet data transmission standard is usually a PPP connection (or PPP instance, or PPP session). The access terminal (T) sends packets across an RF (radio frequency) interface, e.g., a CDMA interface, to a radio access network (RAN). The RAN establishes the PPP instance with the PDSN. More than one such PPP instance may be established contemporaneously (e.g., if a telephone and a laptop each require a connection). IP data packets are routed between the PDSN and the Internet.

When an access terminal changes from one RAN (e.g., an HDR system) to another RAN (e.g., an IS-2000 system) connected to the same NAS, the new RAN establishes a new session of a packet data transmission standard. This action is time consuming because the T must go through the session initiation, and non-transparent to the T because the T must obtain a new IP address.

A method, an apparatus, and an article of manufacture are disclosed to grant a terminal, which is establishing a communication with a network access server via a non-trusted access network, use of a session of a packet data transmission standard designated by an identifier, when a previously established security association between the terminal and the access network can be verified.

SUMMARY OF THE INVENTION

In one aspect, the present invention is directed to a method and an apparatus that allow a terminal, to request a communication with a network access server using a session of the standard for packet data transmission designated by an identifier, and use of the requested session when a security association between the access terminal and the network access server is verified.

In another aspect of the invention, a terminal establishes a communication with a network access server via a first access network using a session of the standard for packet data transmission, which is designated by an identifier. A security association between the terminal and the network access server is then established. When a communication is requested between the network access server and the terminal via a second access network using the session of the standard for packet data transmission designated by the identifier, use of the designated session is allowed when the security association is verified.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF PREFERRED EMBODIMENTS

Figure 1:
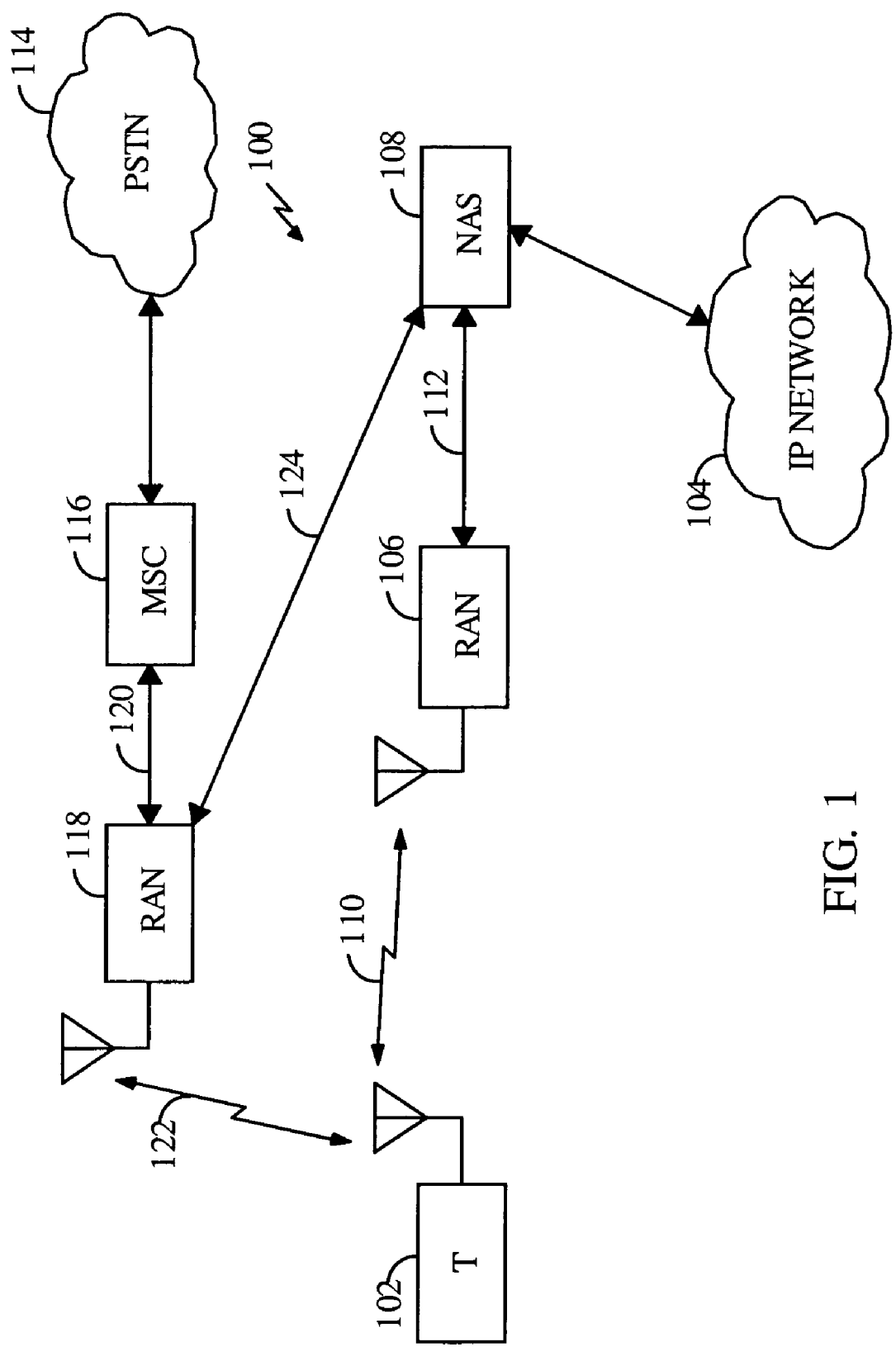
FIG. 1 is a block diagram of a wireless communication system.

FIG. 1 is a block diagram of one embodiment of a wireless communication system 100.

In one embodiment, an access terminal ("AT" or "T") 102 is a wireless device, mobile or stationary, advantageously capable of performing one or more wireless packet data protocols. In one embodiment, the T 102 is not connected to any external device, such as a laptop, and the T 102 runs a protocol for packet data transmission, such as PPP. In an alternative embodiment, the T 102 is connected to an external device, wherein a protocol for packet data transmission is run on the external device. The protocol may comprise a Network Layer $R_m$ Interface Protocol Option described in IS-707, a Relay Layer $R_m$ Interface Protocol Option described in the aforementioned IS-707, or any other applicable protocols known to one skilled in the art.

When a communication between the T 102 and a radio access network (RAN) 106 over a communication channel 110 is requested, the RAN 106 authenticates the T 102. The authentication may be carried out in accordance with a method as described in a U.S. Application filed Dec. 3, 1999, Ser. No. 09/453,612, entitled "METHOD AND APPARATUS FOR AUTHENTICATION IN A WIRELESS TELECOMMUNICATIONS SYSTEM," now U.S. Pat. No. 6,785,823, issued Aug. 31, 2004, assigned to the assignee of the present invention, and incorporated herein by reference. In a particular embodiment, the RAN 106 is a HDR system. However, other alternate multiple access modulation techniques, including TDMA, IS-2000, W-CDMA, and EDGE may be used as will be explained.

The RAN 106 then activates a packet control function (PCF) (not shown), which requests a network access server (NAS) 108 to initiate a session of the standard for packet data transmission, and to grant the T 102 a use of an IP address. In one embodiment, the NAS 108 is a Packet Data Serving Node (PDSN). The NAS 108 then sets up an interface 112 between the RAN 106 and the NAS 108. In one embodiment, the interface between the RAN 106 and the NAS 108 comprises an A10/A11 protocol.

A security association between the NAS 108 and the T 102 is established. In a particular embodiment, the NAS 108 creates a session key (NASKey). The NAS 108 also creates an identifier (T_ID) for identification of the session of the packet data transmission standard associated with the T 102. The NAS 108 then binds the interface 112 and the IP address with the T_ID and the NASKey. The NAS 108 and the T 102 then exchange the NASKey. In one embodiment the NASkey exchange is performed in accordance with the Diffie-Hellman key agreement protocol as disclosed in U.S. Pat. No. 4,200,770, entitled "CRYPTOGRAPHIC APPARATUS AND METHOD," incorporated herein by reference. The T 102 then binds the received T_ID to the NASKey, and stores the T_ID and the NASKey.

The T 102 then communicates with the IP network 104 by encapsulating the IP packets for the IP network 104 into frames destined for a NAS 108, and delivers the IP packets to the NAS 108 via the RAN 106. In one embodiment the IP packets are encapsulated using a point-to-point protocol (PPP) and the resultant PPP byte stream is transmitted to the RAN 106 using a modulation scheme employed by the RAN 106. The RAN 106 sends the received frames to the NAS 108. The NAS 108 extracts the IP packets from the received frames using the same protocol for packet data transmission that was used by the T 102 for encapsulation. After the NAS 108 extracts the IP packets from the data stream, the NAS 108 routes the IP packets to the IP network 104. Conversely, the NAS 108 can receive IP packets from the IP network 104, encapsulate the IP packets into frames, and deliver the frames via the RAN 106 to the T 102.

When a user (not shown) of a public switched telephone network (PSTN) 114 desires to communicate with the T 102, the PSTN 114 notifies a mobile switch center (MSC) 116. The MSC 116 sends a paging request to a RAN 118 via an interface 120. In a particular embodiment, the RAN 118 comprises a system in accordance with IS-2000. Consequently, the data is wirelessly transmitted using CDMA multiple access techniques, as described in U.S. Pat. No. 5,103,459, entitled "SYSTEM AND METHOD FOR GENERATING SIGNAL WAVEFORMS IN A CDMA CELLULAR TELEPHONE SYSTEM", and U.S. Pat. No. 4,901,307, entitled "SPREAD SPECTRUM MULTIPLE ACCESS COMMUNICATION SYSTEM USING SATELLITE OR TERRESTRIAL REPEATERS," both assigned to the assignee of the present invention and incorporated herein by reference. However, one skilled in the art recognizes that the invention is equally applicable when the RAN 106 and the RAN 118 do not have a common means for authentication of the T 102. Therefore, other alternate multiple access modulation techniques, including HDR, TDMA, W-CDMA, and EDGE might be used.

Upon receiving the paging request, the RAN 118 sends a page to the T 102 over the communication channel 122, and the T 102 changes its communication mode to the communication mode of the RAN 118. The T 102 then sends a page response to the RAN 118. Upon receiving the page response, the RAN 118 and the MSC 116 establish communication in accordance with the appropriate protocol. In one embodiment, the protocol comprises the Inter-operability Specification (IOS) for IS-2000 Access Network Interfaces. The T 102 and the RAN 118 then setup a voice call. In one embodiment, the voice call is setup in accordance with IS-2000.

When the voice call ends, the T 102 and the NAS 108 may initiate a data call via the RAN 118. The T 102 identifies the session of the packet data transmission standard that the T 102 wishes to use by sending the T_ID to the RAN 118. The RAN 118 requests the NAS 108 to connect an A10/A11 interface 124 to the session of the standard for packet data transmission associated with the T 102 designated by the T_ID.

The NAS 108 may challenge the T 102 to ensure that a rogue T (not shown) is not attempting to redirect the traffic that is destined to the T 102 to another HDR RAN. The NAS 108 has discretion to initiate the challenge that is performed, in general, when a new A10/A11 interface is being set-up. For example, a NAS and a T do not have to carry out the challenge/response each time the T establishes a traffic channel. The challenge-response is carried out using the NASKey, which has been exchanged between the NAS 108 and the T 102 when the T 102 initiated communication via the RAN 106. If the T 102 successfully passes the challenge, the NAS 108 establishes the A10/A11 interface 124 from the RAN 118 to the session of the standard for packet data transmission designated by T_ID. If the challenge fails, the NAS 108 responds in accordance with security measures established in the network. For example, the NAS 108 may treat the challenged T (rogue T or T 108) as a new T trying to access the network. The NAS 108 then initiates a new session of the standard for packet data transmission, and creates a mechanism for authentication of the challenged T and for identification of the session. The NAS 108 may also treat the challenged T as a rogue T and refuse any communication.

The T 102 then communicates with the IP network 104 by encapsulating the IP packets for the IP network 104 into frames destined for a NAS 108, and delivers the IP packets to the NAS 108 via the RAN 118.

One skilled in the art recognizes that the T 102 change from the RAN 106 to the RAN 118 may be caused by circumstances other than an incoming voice call as described. For example, the T 102 can move from a coverage area of the RAN 106 to a coverage area of the RAN 118.

Figure 2:
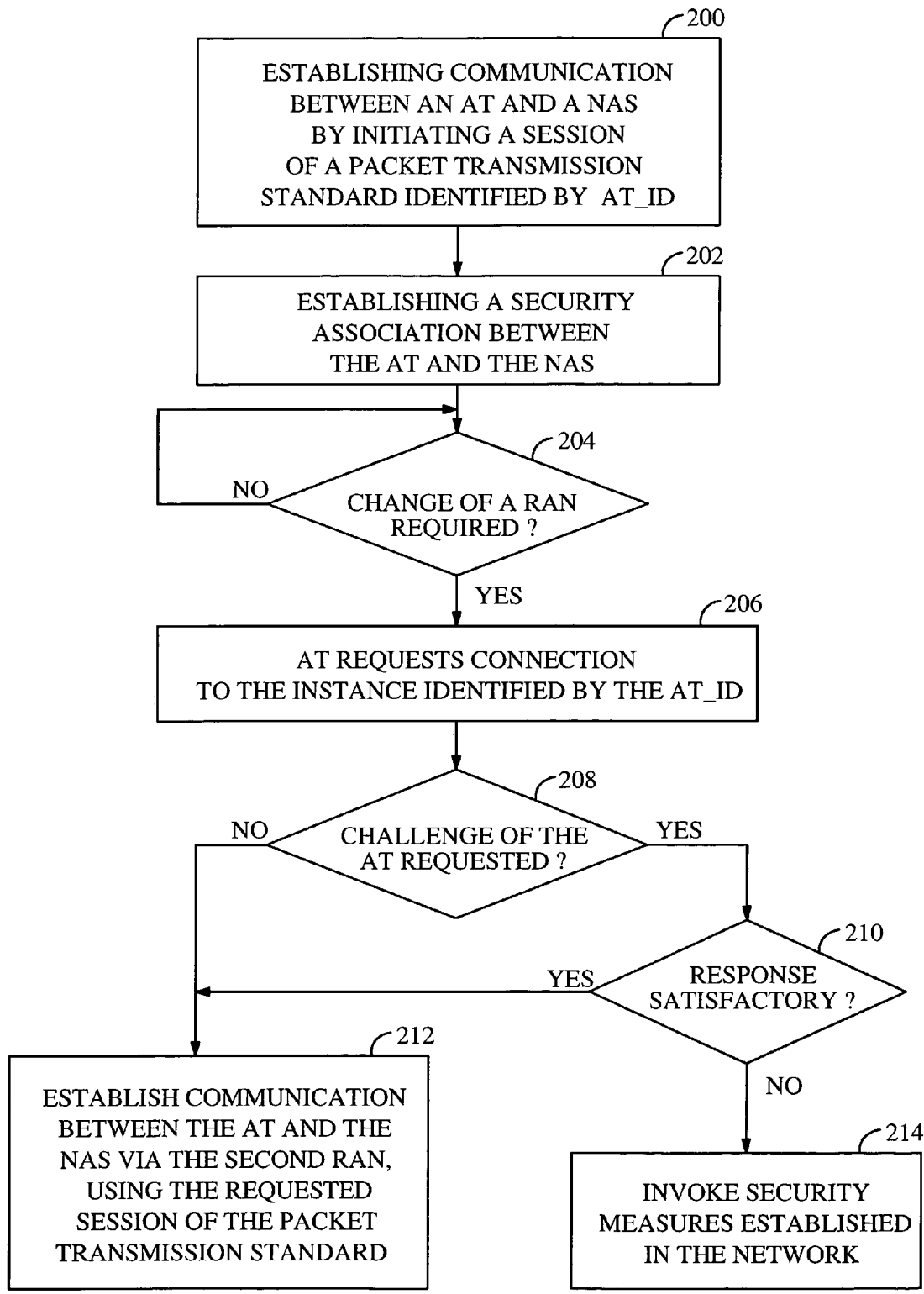
FIG. 2 is a flow chart illustrating a method performed in accordance with one embodiment of the present invention.

FIG. 2 is a flow chart illustrating a method performed in accordance with one embodiment of the present invention.

In block 200, a communication between a T and a NAS via a first RAN is established by initiating a session of a packet data transmission standard. The session is designated by an identifier associated with the T (T_ID or AT_ID). The method then proceeds to block 202.

In block 202, a security association between the NAS and the T is established by exchanging a session key (NASKey) between the NAS and the T. The T and the NAS then exchange data. The method then proceeds to block 204.

In block 204, a determination whether change of RAN is required is made. If change of RAN is not required, the method returns to block 204. If change of RAN is required, the method proceeds in block 206.

In block 206, the T requests the NAS to establish a communication by identifying the session of the packet data transmission standard the T wishes to use.

The T identifies the session by sending the T_ID to the NAS via the second RAN. The method then proceeds to block 208.

In block 208, the NAS determines whether to challenge the T to verify that the T is the owner of the requested session of the packet data transmission standard. If the NAS determines that no challenge is necessary, the method proceeds to block 212. If the NAS decides to challenge the T, the method continues in block 210.

In block 210, the T responds to the challenge using the NASKey. The NAS determines whether the response was satisfactory. If the response was satisfactory, the method proceeds to block 212. If the response was unsatisfactory the method proceeds to block 214.

In block 212, the NAS establishes the A10/A11 interface from the second RAN to the session of the standard for packet data transmission designated by T_ID, if the access terminal successfully passes the challenge. The T and the NAS then exchange data.

In block 214, the NAS responds in accordance with security measures established in the network.

Figure 3:
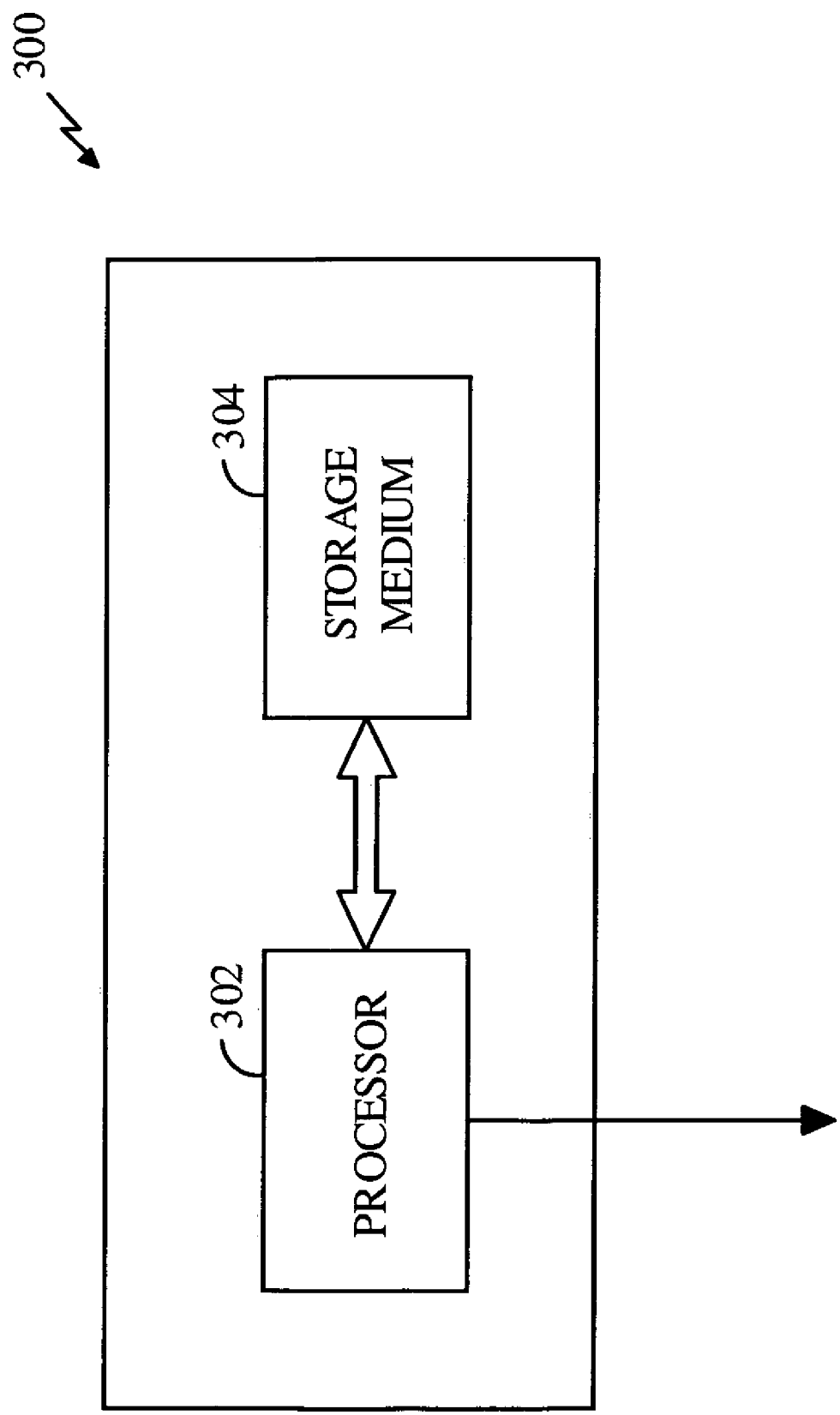
FIG. 3 is an apparatus in accordance with one embodiment of the present invention.

FIG. 3 illustrates elements of an apparatus 300 in accordance with one embodiment of the present invention.

The apparatus 300 comprises a processor 302 and storage medium 304 accessible by the processor and containing a set of instructions readable and executable by the processor 302.

Although particular protocols were used when describing the above-mentioned embodiments, one skilled in the art recognizes that other protocols may be used without departing form a scope of this invention. Thus, for example, in one embodiment the T 102 generates IP packets, and the NAS 108 is coupled to the IP network 104. One skilled in the art recognizes that alternate embodiments could use formats and protocols other than IP. In addition, the NAS 108 may be coupled to a network capable of employing protocols other than IP. Likewise, in one embodiment the T 102 has the ability to perform RLP (Radio Link Protocol), PPP, Challenge Handshake Authentication Protocol (CHAP), and Mobile IP. In a particular embodiment, the RAN 106 communicates with the T 102 using RLP. In one embodiment, the NAS 108 supports PPP functionality, including Link Control Protocol (LCP), CHAP, and the PPP Internet Protocol Control Protocol (IPCP).

Furthermore, although a wireless communication system comprising a T and a RAN was used to communicate with the NAS, one skilled in the art would recognize that other communication systems (whether wireless or not) may be used. In particular, when a T attempts to communicate with a NAS via a non-trusted access network, the scope of the invention, as disclosed in the described embodiments, is applicable.

Those of skill in the art would understand that the various illustrative logical blocks, modules, circuits, and algorithm steps described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application.

As examples, the various illustrative logical blocks, modules, circuits, and algorithm steps described in connection with the embodiments disclosed herein may be implemented or performed with a digital signal processor (DSP), an application specific integrated circuit (ASIC), a field programmable gate array (FPGA) or other programmable logic device, discrete gate or transistor logic, discrete hardware components such as, e.g., registers and FIFO, a processor executing a set of firmware instructions, any conventional programmable software module and a processor, or any combination thereof.

The processor may advantageously be a microprocessor, but in the alternative, the processor may be any conventional processor, controller, microcontroller, or state machine. The software module could reside in RAM memory, flash memory, ROM memory, registers, hard disk, a removable disk, a CD-ROM, or any other form of storage medium known in the art. Those of skill would further appreciate that the data, instructions, commands, information, signals, bits, symbols, and chips that may be referenced throughout the above description are advantageously represented by voltages, currents, electromagnetic waves, magnetic fields or particles, optical fields or particles, or any combination thereof.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for allowing a terminal to use a previously established session of a packet data transmission standard designated by an identifier, the method comprising:
    requesting establishment of a communication via a second access network between the terminal and a network access server to use the session designated by the identifier, the session being previously established via a first access network between the terminal and the network access server, wherein the first and second access networks use different multiple access modulation techniques;
    requesting the terminal to provide a session key previously established between the terminal and the network access server; and
    establishing the communication via the second access network if the terminal provides the previously established session key.

2. The method of claim 1, wherein the first access network is a radio access network.

3. The method of claim 1, wherein the second access network is a radio access network.

4. The method of claim 1, wherein the packet data transmission standard comprises a point-to-point protocol.

5. The method of claim 1, wherein the network access server comprises a packet data service node.

6. A method for allowing a terminal to use a same session of a standard for packet data transmission when the terminal changes from a first access network to a second access network, the method comprising:
    establishing a communication between a network access server and the terminal via the first access network using the session of the standard for packet data transmission, wherein the session is designated by an identifier;
    establishing a security association between the terminal and the network access server;
    receiving a request to establish a communication between the network access server and the terminal via the second access network using the session designated by the identifier, the first and second access networks using different multiple access modulation techniques; and
    establishing the communication with the terminal via the second access network if the network access server verifies the security association between the terminal and the network access server.

7. The method of claim 6, wherein the first access network is a radio access network.

8. The method of claim 6, wherein the second access network is a radio access network.

9. The method of claim 6, wherein the standard for packet data transmission comprises a point-to-point protocol.

10. The method of claim 6, wherein the network access server comprises a packet data service node.

11. The method of claim 6, wherein the security association comprises a session key.

12. An apparatus allowing a terminal to use a previously established session of a packet data transmission standard designated by an identifier, the apparatus comprising:
    a processor; and
    a processor-readable storage medium accessible by the processor and containing a set of instructions executable by the processor to:
    request establishment of a communication via a second access network between the terminal and a network access server to use the session designated by the identifier, the session being previously established via a first access network between the terminal and the network access server, wherein the first and second access networks use different multiple access modulation techniques;
    request the terminal to provide a session key previously established between the terminal and the network access server; and
    establish the communication via the second access network if the terminal provides the previously established session key.

13. The apparatus of claim 12, wherein the first access network is a radio access network.

14. The apparatus of claim 12, wherein the second access network is a radio access network.

15. The apparatus of claim 12, wherein the packet data transmission standard comprises a point-to-point protocol.

16. The apparatus of claim 12, wherein the network access server comprises a packet data service node.

17. An apparatus for allowing a terminal to use a same session of a standard for packet data transmission when the terminal changes from a first access network to a second access network, the apparatus comprising:
    a processor; and
    a processor-readable storage medium accessible by the processor and containing a set of instructions executable by the processor to:
        establish a communication between a network access server and the terminal via the first access network using the session of the standard for packet data transmission, wherein the session is designated by an identifier;
        establish a security association between the terminal and the network access server;

receive a request to establish a communication between the network access server and the terminal via the second access network using the session designated by the identifier, the first and second access networks using different multiple access modulation techniques; and establish the communication with the terminal via the second access network if the network access server verifies the security association between the terminal and the network access server.

18. The apparatus of claim 17, wherein the first access network is a radio access network.

19. The apparatus of claim 17, wherein the second access network is a radio access network.

20. The apparatus of claim 17, wherein the standard for packet data transmission comprises a point-to-point protocol.

21. The apparatus of claim 17, wherein the network access server comprises a packet data service node.

22. The apparatus of claim 17, wherein the security association comprises a session key.

23. The method of claim 6, wherein the first access network comprises at least one of a high data rate (HDR) system, an Industry Standard 2000 (IS-2000) system, a time division multiple access (TDMA) system, a wideband code division multiple access (W-CDMA) system, and an EDGE system.

24. The method of claim 6, wherein the second access network comprises at least one of a high data rate (HDR) system, an Industry Standard 2000 (IS-2000) system, a time division multiple access (TDMA) system, a wideband code division multiple access (W-CDMA) system, and an EDGE system.

25. The method of claim 1, wherein the identifier comprises an identifier of the terminal.

26. The method of claim 1, wherein the terminal comprises a mobile phone.

27. The method of claim 1, wherein the terminal comprises a stationary device.

28. The method of claim 1, further comprising establishing an interface between the network access server and the first access network.

* * * * *